(12) United States Patent
Witt et al.

(10) Patent No.: US 12,475,251 B2
(45) Date of Patent: Nov. 18, 2025

(54) SYSTEM AND METHOD FOR MEDICAL DATA-ANALYSIS MANAGEMENT

(71) Applicant: Fresenius Medical Care AG & Co. KGaA, Bad Homburg (DE)

(72) Inventors: Waldemar Witt, Bad Homburg (DE); Martin Pospiech, Bad Homburg (DE)

(73) Assignee: Fresenius Medical Care AG, Bad Homburg (DE)

( * ) Notice: Subject to any disclaimer, the term of this patent is extended or adjusted under 35 U.S.C. 154(b) by 315 days.

(21) Appl. No.: 18/122,049

(22) Filed: Mar. 15, 2023

(65) Prior Publication Data

US 2023/0359762 A1  Nov. 9, 2023

(30) Foreign Application Priority Data

May 3, 2022  (EP) .................................... 22171231

(51) Int. Cl.
G06F 21/62 (2013.01)
G06Q 20/08 (2012.01)

(52) U.S. Cl.
CPC ....... *G06F 21/6245* (2013.01); *G06Q 20/085* (2013.01); *G06Q 2220/12* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 11,003,791 B2 | 5/2021 | Wang et al. | |
| 2018/0082023 A1 | 3/2018 | Curbera et al. | |
| 2019/0354693 A1 | 11/2019 | Yoon et al. | |
| 2020/0213110 A1* | 7/2020 | Cage | G06F 16/182 |
| 2020/0227160 A1 | 7/2020 | Youngblood et al. | |
| 2020/0327250 A1 | 10/2020 | Wang et al. | |
| 2020/0327969 A1 | 10/2020 | Malvankar et al. | |
| 2021/0375409 A1* | 12/2021 | Romantsov | H04L 67/1097 |

OTHER PUBLICATIONS

Purohit et al., *Peer-to-Peer Networking and Applications*, vol. 14, 3012-3028 (2021).

(Continued)

*Primary Examiner* — Esther B. Henderson
(74) *Attorney, Agent, or Firm* — Leydig, Voit & Mayer, Ltd.

(57) ABSTRACT

A system for managing analysis of health information includes data-storage components configured for storage and retrieval of health information, sealed processing components configured for performing a conformity evaluation of data related to the health information and analytics data related to analysis requests, distributed-ledger components configured for regulation of data exchange between components of the system, and sealed processing components configured for performing specific data analytics on specific health information according to the conformity evaluation. The sealed processing components are characterized by a non-editable regulation on the distributed-ledger components preventing the sealed processing components from transmitting, to an external destination, certain protected data related to the specific data analytics on specific health information.

20 Claims, 4 Drawing Sheets

(56) References Cited

OTHER PUBLICATIONS

Pournaghi et al., "MedSBA: a novel and secure scheme to share medical data based on blockchain technology and attribute-based encryption," Journal of Ambient Intelligence and Humanized Computing, vol. 11, No. 11, Springer, pp. 4613-4641, DOI: 10.1007/s12652-020-01710-Y (Jan. 21, 2020).

European Patent Office, Office Action in European Patent Application No. 22171231.8, 10 pp. (Mar. 28, 2025).

* cited by examiner

Fig. 4

SYSTEM AND METHOD FOR MEDICAL DATA-ANALYSIS MANAGEMENT

CROSS-REFERENCE TO RELATED APPLICATION

Priority is claimed to European Patent Application No. EP22171231.8, filed on May 3, 2022, the entire disclosure of which is hereby incorporated by reference herein.

TECHNICAL FIELD

The present application relates to the management of medical data and their analysis, and, particularly, to a system and method to enable secure and efficient employment of health information for data analytics.

BACKGROUND

In recent years, significant progress of digitalization in the practical medical field has enabled generation, collection, and use-specific employment of large amounts of health-related data. The growing supply is matched on the demand side by data needs of rapidly evolving data-analytics methods for medical use cases. However, a multitude of different technical interfaces, data-security and patient privacy requirements with highly variable and dependent regulations restrain the practical combination of data and analytics. Since respective restraints on management of medical data have to be aligned, particular problems arise with inter-party interactions, i.e., different data providers and users respectively. In view of the particularly sensitive nature of medical data, an unmet need is ensuring the security of medical data employed in data analytics throughout the interaction processes. Additionally, efficiency in controlling the processes of data-analytics management poses a significant technical challenge.

An example scenario comprises a health-data analytics entity requiring specific health information for specific analytics to be performed. In parallel, a healthcare provider might aggregate a large quantity of health information derived from patients, therapies, prescribed drugs, etc. However, both parties are interested in keeping control of their respective health information or analytics data; particularly impacts on data security of patient-related data and non-controllable data proliferation inherent to classical data-exchange processes, e.g., copy from source to destination, are to be prevented.

SUMMARY

In an exemplary embodiment, the present application provides a system for managing analysis of health information. The system includes: one or more memories configured for storage and retrieval of health information; one or more first processors configured for performing a conformity evaluation of data related to the health information and analytics data related to an analysis request, a distributed-ledger database system comprising a plurality of nodes configured for regulation of data exchange; and one or more second processors configured for performing specific data analytics on specific health information according to the conformity evaluation. The distributed-ledger database system includes a non-editable regulation preventing transmission of certain protected data relating to the specific data analytics on specific health information, and wherein at least one action of the one or more first processors and/or the one or more second processors is performed subject to the non-editable regulation.

In a further exemplary embodiment, the health information is controlled by a healthcare provider and the analysis request is from an analytics entity, and the system is further configured to output a result of the specific data analytics to the analytics entity and trigger a financial transfer to the healthcare provider.

In a further exemplary embodiment, the one or more first processors and the one or more second processors are sealed processing components.

In a further exemplary embodiment, the system further includes interfaces for system-external access, wherein access-request logs are transferred to the distributed-ledger database system.

In a further exemplary embodiment, the interfaces are further configured to only allow system-external access to the one or more first processors and the one or more second processors based on respective access requests being allowable by data-exchange regulations on the distributed-ledger database system.

In a further exemplary embodiment, the distributed-ledger database system comprises interfaces to system-external components.

In a further exemplary embodiment, the regulation of data exchange is implemented via smart contracts which are automatically executed in response to input from the system-external components via the interfaces.

In a further exemplary embodiment, the regulation of data exchange is implemented via smart contracts which are automatically executed in response to input from one or more of: the one or more memories, the one or more first processors, the one or more second processors, or the distributed-ledger database system.

In a further exemplary embodiment, the data related to health information comprise additional metrics for one or more of a health-information type, a data quality, or a data quantity.

In a further exemplary embodiment, the analytics data related to the analysis request comprise additional metrics for one or more of a health-information type, a data quality, or a data quantity.

In a further exemplary embodiment, the one or more first processors are further configured to generate execution prompts and transfer the execution prompts to the distributed-ledger database system.

In a further exemplary embodiment, the one or more second processors are further configured to transfer analytics results to system-external targets based on being prompted by execution prompts on the distributed-ledger database system and/or additional system-external input prompts.

In a further exemplary embodiment, the system is further configured to integrate additional system-external processing components as sealed processing components.

In a further exemplary embodiment, the integration of the additional system-external processing components is limited by time, interaction number, processed data amount, and/or disintegration trigger prompts.

In another exemplary embodiment, the present application provides a computer-implemented method for managing analysis of health information. The method includes: retrieving data related to health information from a data storage; retrieving analytics data related to an analysis request; performing and/or triggering the performing of a conformity evaluation of the retrieved data related to the health information and the retrieved analytics data related to the analysis request; performing and/or triggering the performing of data analytics according to a conformity-compliant subset of the retrieved analytics data on a conformity-compliant subset of the retrieved data related to health information; and outputting and/or triggering the outputting of results of the performed data analytics subject to regulations which prevent output of certain protected data.

In a further exemplary embodiment, the health information is controlled by a healthcare provider and the analysis request is from an analytics entity, and a result of the data analytics is output to the analytics entity and a financial transfer to the healthcare provider is triggered.

In a further exemplary embodiment, execution of the method is conditional with respect to regulations implemented as smart contracts on a distributed-ledger system.

In a further exemplary embodiment, performing the conformity evaluation comprises: determining first metrics for one or more of a health-information type, a data quality, or a data quantity for subsets of the retrieved data related to health information; determining second metrics for one or more of a health-information type, a data quality, or a data quantity for subsets of the retrieved analytics data related to the analysis request; comparing the first and second metrics; and based on the comparison and a threshold value, establishing conformity-compliance between subsets of the retrieved data related to health information and subsets of the retrieved analytics data related to the analysis request.

In yet another exemplary embodiment, the present application provides one or more non-transitory computer-readable mediums having processor-executable instructions stored thereon for managing analysis of health information. The processor-executable instructions, when executed, facilitate performance of the following by a system: retrieving data related to health information from a data storage; retrieving analytics data related to an analysis request; performing and/or triggering the performing of a conformity evaluation of the retrieved data related to the health information and the retrieved analytics data related to the analysis request; performing and/or triggering the performing of data analytics according to a conformity-compliant subset of the retrieved analytics data on a conformity-compliant subset of the retrieved data related to health information; and outputting and/or triggering the outputting of results of the performed data analytics subject to regulations which prevent output of certain protected data.

In a further exemplary embodiment, the health information is controlled by a healthcare provider and the analysis request is from an analytics entity; and the processor-executable instructions, when executed, facilitate performance of the following by the system: outputting of a result of the data analytics to the analytics entity and triggering of a financial transfer to the healthcare provider.

BRIEF DESCRIPTION OF THE DRAWINGS

Exemplary embodiments of the present application will be described in even greater detail below based on the exemplary figures. The application is not limited to the exemplary embodiments. All features described and/or illustrated herein can be used alone or combined in different combinations in embodiments of the application. Features and advantages of various embodiments of the present application will become apparent by reading the following detailed description with reference to the attached drawings which illustrate the following.

DETAILED DESCRIPTION

To address challenges inherent to modern analysis of medical data, exemplary embodiments of the present application provide a systematic approach to the involved components and processes and their synergetic alignment in one holistic solution. In an exemplary embodiment, the present application provides a system for managing analysis of health information, wherein the specific configuration and interplay of the system components allow for management of processes involved in medical data analytics, with a particular focus on the security of involved data. In another exemplary embodiment, the present application provides a computer-implemented method for managing analysis of health information, wherein the specific interplay of the method steps allows for bringing together health information and analytical information to perform matched data analytics, with a particular focus on the security of involved data.

In an exemplary embodiment, the system relates to an automatic facilitating of data-analytics processes via matching of available data and analysis requests, the triggering and/or performing of analysis conditional to the matching, and the distribution of the analysis results to involved parties in compliance with defined data-flow regulations. A specific emphasis is put on the data security of both medical and analytics data throughout the whole process. Particularly, mechanisms for the prevention of compromising, publishing, duplicating, and/or tampering of/with the involved data are encompassed.

In an exemplary embodiment, a system for managing analysis of health information comprises data-storage components configured for storage and retrieval of health information, first sealed processing components configured for performing a conformity evaluation of data related to the health information and analytics data related to analysis requests, distributed-ledger components configured for regulation of data exchange between components of the system, and second sealed processing components configured for performing specific data analytics on specific health information according to the conformity evaluation. The sealed feature of processing components is characterized by a non-editable regulation on the distributed-ledger components preventing the sealed processing components from transmitting, to an external destination, certain protected data that are related to the specific data analytics on specific health information.

In another exemplary embodiment, a computer-implemented method for managing analysis of health information comprises the steps of retrieving of data related to health information from a data storage, retrieving of analytics data related to analysis request, performing and/or triggering the performing of a conformity evaluation of retrieved data related to the health information and retrieved analytics data related to analysis request, performing and/or triggering the performing of data analytics according to a conformity-compliant subset of retrieved analytics data on a conformity-compliant subset of retrieved data related to health information, and output and/or triggering the output of results of performed data analytics subject to regulations which prevent output of certain protected data.

In an aspect, the sealed processing components of the system comprise interfaces for system-external access, wherein access-request logs are transferred to the distributed-ledger components.

In an aspect, the interfaces for system-external access are further configured to only allow system-external access to the sealed processing components if the access requests are allowable by the data-exchange regulations on the distributed-ledger components.

In an aspect, the distributed-ledger components comprise interfaces to system-external components.

In an aspect, the regulations of data exchange between components of the system are implemented as smart contracts, which are automatically executed conditional to input from system components and/or external components via the interfaces.

In aspects, the data related to health information and/or the analytics data related to analysis requests comprise additional metrics for one or more of a health-information type, data quality, or data quantity.

In an aspect, the processing components configured for performing a conformity evaluation are further configured to generate execution prompts and transfer the execution prompts to the distributed-ledger components.

In an aspect, the processing components configured for data analytics are further configured to transfer analytics results to system-external targets if prompted by execution prompts on the distributed-ledger components and/or additional system-external input prompts.

In an aspect, the system is further configured to integrate additional system-external processing components as sealed processing components.

In an aspect, the integration of system-external processing components is limited by one or more of time, interaction number, processed data amount, and/or disintegration trigger prompts.

In an aspect, the execution of the method's steps is performed conditional to regulations implemented as smart contracts on a distributed-ledger system.

In an aspect, the method step of performing a conformity evaluation comprises the steps of determining the value of a metrics for one or more of a health-information type, data quality, or data quantity for subsets of the retrieved data related to health information, determining the value of a metrics for one or more of a health-information type, data quality, or data quantity for subsets of the retrieved analytics data related to analysis request, comparing the determined metrics, and based on the comparison and a threshold value establish conformity-compliance between subsets of the retrieved data related to health information and subsets of the retrieved analytics data related to analysis request.

In an aspect, a computer program is provided. The computer program comprises instructions which, when the program is executed by a computer, cause the computer to carry out the steps of a method according to the present application.

Example embodiments of the present disclosure will be described below.

It will be appreciated that such embodiments are merely examples, and that various variations, changes, and substitutions may occur to those skilled in the art without departing from the principles of the application. Alternatives to the described embodiments of the application may be employed.

The present application provides systems and methods for management of medical data analytics. Aspects of the application described herein may be applied to any application described. Application of the application both as autonomous data-management system and as integrated part of an extended system are encompassed. Different aspects of the application described can be appreciated individually, collectively or in combination with each other.

Figure 1:
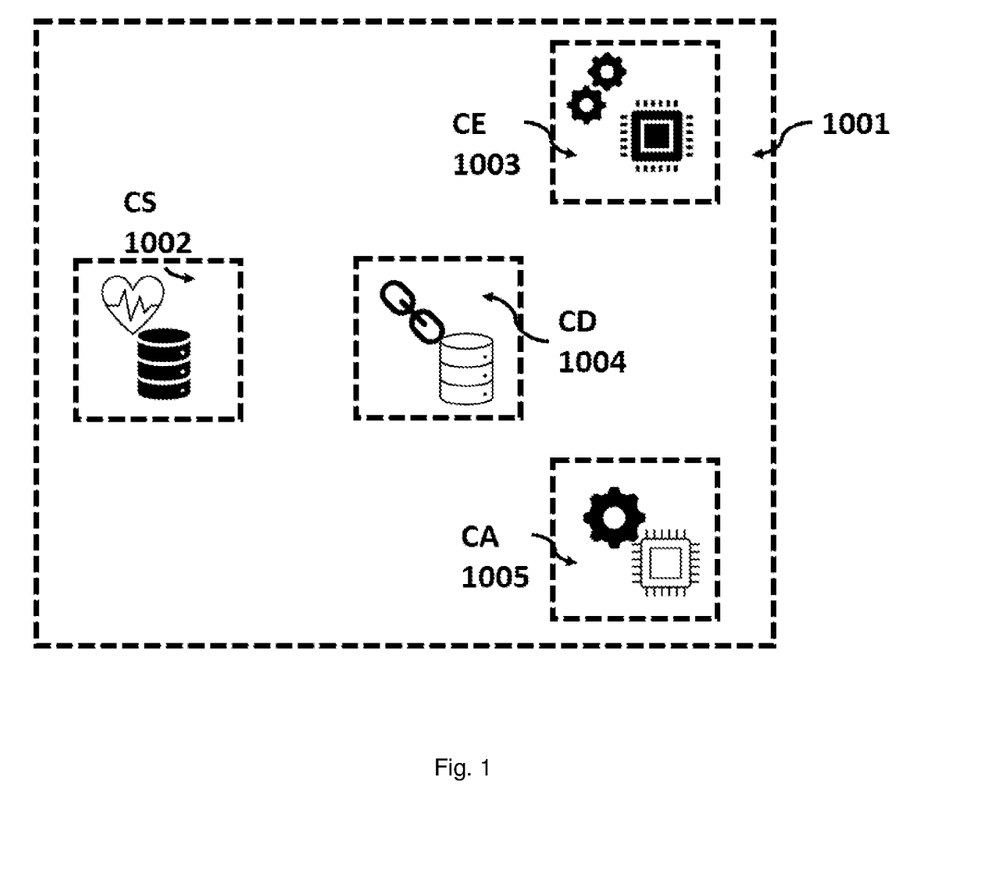
FIG. 1 is a block diagram depicting components of a system according to an embodiment of the present application.

FIG. 1 provides a schematic depicting the system for managing analysis of health information according to the application.

The system 1001 comprises a multitude of components 1002, 1003, 1004, and 1005.

All components are, generally, configured for bi-directional data transfer with each other respective component, separately or in combination. A limitation of the directionality and content of the data transfer and, particularly, a control of the data flow within the system up to the exclusion of any data transfer between the components is encompassed within the application.

No limitation to spatial allocation of the components is to be implied from the depiction since data communication between the components can be established via remote data transfer. All components can also be implemented as software systems on generic or specialized computational hardware. Allocation of several components' functions to a shared pool of computational hardware—i.e., computation in a distributed "cloud" environment— may also be implemented.

The system components are synergetically employed to address aspects of the medical-data analysis and the management thereof; i.e., the storing and retrieving of medical data, the matching of medical data to analysis data, and the performing of the processing related to the data analysis, whereby a special emphasis is put on the control of the involved data flows to address data-security and privacy needs of specifically sensitive data, i.e. here health-related information.

Data-storage components 1002 (CS) are configured for storing data, particularly health information, for further retrieval, and can include any of volatile, non-volatile and semi-permanent memory and other electronic elements, as well as magnetic or optical data storage.

Several interfaces for transferring parts of the data from the data-storage components via a data network to other components of the system 1001, e.g., as encompassed by the TCP/IP or OSI models may be comprised by the data-storage components CS 1002. Same or additional interfaces or interface layers can be employed for formatting transferred data between different data formats and/or encrypting/decrypting of the transferred data.

The data-storage components CS 1002 can additionally be equipped with interfaces for transferring data to the data-storage components CS 1002. In the case of health information and related data, data transfers can be made to respective infrastructures of different parties contributing to generation and collection of health information, e.g., electronic health records, medical files, clinical databases, etc.

Health information stored in the data-storage components CS 1002 comprise all kinds of data suitable to describe statics (e.g., current status) or dynamics (e.g., series of time-dependent parameters) of a person's health, a clinical study, a medical treatment, a therapy, omics, drugs, and other data suited for data analysis in a medical context. One example data set could comprise a healthcare facility's patient information such as age, sex, race and their respective therapy data such as historic and current treatments, treatment parameters, drug prescriptions, physical parameters, etc. This information can be accompanied by peripheral non-medical data such as personal details, financials, locations, time logs, etc. Additional metadata (e.g., data describing the contained information such as data type, size, date, etc.) may be attached to each subset of health information, either when generated before transfer to the data-storage components CS 1002 and/or when being stored to them.

Processing components 1003 and 1005, respectively, comprise processors configured for electronic data processing, and particularly for performing data analysis involving computational processes. No limitation on the specific implementation of such processing components should be implied from this description.

Next to general data-transfer interfaces, the processing components 1003 and 1005, respectively, can comprise additional interfaces specifically configured for system-external access, which control data flow with external entities depending on additional input received by other system components, particularly by the distributed-ledger components 1004 as described below.

Processing components configured for conformity evaluation, as described below, 1003 (CE) comprise respective interfaces for data exchange with the data-storage components CS 1002 and system-external entities. Particularly, the interfaces are configured for receiving, from the data-storage components CS 1002, data related to the health information and receiving, from the external entities, analytics data, as described below, related to an analysis request.

The processing components CE 1003 may further configured to feed the data received to comprised processor(s) for processing for performing a conformity evaluation according to further description in this disclosure.

The results of the conformity evaluation are employed for triggering further actions from the system 1001 components. For this purpose, the comprised interfaces selectively transfer data associated with the results to respective system components and/or external entities.

In one aspect, the processing components CE 1003 are further configured to generate execution prompts and transfer the execution prompts, i.e., signals causing execution of respective processes when received; or data related to such prompts, to the distributed-ledger components 1004 of the system 1001.

Data related to the health information as transferred to the processing components CE 1003 from the data-storage components CS 1002 are considered data representing attributes of the reflected health information to be evaluated for conformity. The data related to health information do not necessarily have to comprise parts of the health information; particularly, the total medical content underlying the health information is not considered necessary for the conformity evaluation.

In one aspect, the data related to health information transferred to processing component CE 1003 is significantly different and/or shares no overlap with data required for performing specific data analytics on specific health information. In one aspect, the data related to health information serves the identification of specific health information and allows for a matching with data serving the identification of specific data analytics.

In one aspect, the data related to health information comprise additional metrics for one or more of a health-information type, data quality, or data quantity. In an example, the metrics may comprise information on how much data are contained, e.g., in size and/or in amount of covered individuals/facilities/time; information on the quality of the data, e.g., according to a rating, completeness, noise ratio; and/or information on type, e.g., specific patient group, specific physical parameters, specific data format, etc. Such metrics and other metadata can be employed for identifying specific subsets of the underlying health information without direct access to the health information.

Analytics data related to analysis requests as transferred to the processing components CE 1003 from system-external entities are considered data representing attributes of the reflected analysis requests to be evaluated for conformity. The analytics data related to analysis requests do not necessarily have to comprise parts of the analysis data, e.g., their involved algorithms, source code, etc.; particularly, the total analysis content underlying the analytics data is not considered necessary for the conformity evaluation. In one aspect, the analytics data related to analytics requests transferred to processing components CE 1003 is significantly different and/or shares no overlap with data required for performing specific data analytics on specific health information.

In one aspect, the analytics data related to analytics requests serves the identification of specific health information and allows for a matching with data serving the identification of specific health information.

In one aspect, the analytics data related to analytics requests comprise additional metrics for one or more of a, e.g., requested, health-information type, data quality, or data quantity. Such metrics and other metadata can be employed for identifying specific subsets, i.e., specific parts corresponding to certain selection criteria, of the underlying analytics data without direct access to the analytics data. The use of such representative metrics allows for an increased processing efficiency and/or a layer of de-identification to the total data involved.

The reduced data flow and processing requirements on processing components CE 1003, as resulting from receiving and processing, for a conformity evaluation, only representatives of the total data required for specific data analytics or specific health information, allows for the processing components CE 1003 to be implemented in an efficient configuration adapted to the reduced processing requirements.

In one aspect, the distribution of the total system 1001 processing resources can be shifted between processing components CE 1003 and components 1005 respectively.

In one further aspect, the shift of processing resources is implemented in favor of the processing components configured for performing specific data analytics on specific health information 1005 based on the reduced requirements of processing components CE 1003.

Distributed-ledger components 1004 (CD) of the system 1001 comprise implementations of distributed-ledger technology, and, generally, may encompass a database system on a peer-to-peer network, whereby several database-system components (nodes) are distributed but synchronized, and whereby the synchronization comprises an update to all network nodes following a consensus algorithm. The consensus algorithm involved may be any of proof of work, proof of stake, votes by node, or hashgraph.

A consensus algorithm preferred in the implementation of the components CD 1004 within this application is a consensus algorithm according to a proof-of-stake protocol with the technical effect of reducing computational cost inherent to typical proof-of-work protocols.

The distributed ledger may be permissioned or permissionless. In a preferred implementation, a hybrid implementation of the ledger allows parts of it to be permissioned and other parts of it to be permissionless, which, in term, enables a technical adaptability of the system to cover a variety of potential use cases.

In one aspect, the distributed-ledger components CD 1004 comprise private components, for which consensus is established only by certain system nodes affiliated with entities contributing data to the system.

In one aspect, the distributed-ledger components CD 1004 comprise public components, for which consensus is established when voted for by all nodes according to the consensus algorithm.

In one aspect, the distributed-ledger components CD 1004 comprise public components, for which no consensus can be established according to the consensus algorithm; i.e., no changes can be effected and this information is publicly accessible.

The distributed-ledger components CD 1004 are employed within the system 1001 for regulating data exchange between the system components 1002-1005 and optionally system-external entities. For this purpose, the regulations are stored on the underlying database system, or parts of it, and comprise sets of conditions and respective actions both related to data input and/or output to/from the distributed-ledger components CD 1004.

In a general aspect, the regulations can include a set of specific input by a set of specific system 1001 and/or external components as condition, and a set of specific output to a set of specific system 100 and/or external components as action. In one aspect, the conditions and actions can be related to other regulations stored on the distributed-ledger components CD 1004.

In one further aspect, regulations can be combined to form a chain of conditions and actions, and such combinations can optionally be stored as a new regulation.

Being encompassed within the distributed-ledger system CD 1004, all regulations stored thereon are subject to the underlying change process, i.e., synchronization according to a consensus algorithm. A combination of public and/or private components with different consensus algorithms is well applicable to differentiate in distinct types of regulations.

According to the application, one or more non-editable regulations are stored on the distributed-ledger system CD 1004. This can preferably be implemented via a public database component, for which no consensus can be established according to the consensus algorithm.

According to the present application, one of such non-editable regulations defines the "sealed" feature of processing components 1003 and 1005. For this the regulation is configured as conditional to data input from the processing components 1003 and 1005, respectively, and as action prevents sealed processing components 1003 and 1005 from outputting certain protected data related to the specific data analytics or specific health information to an external destination.

In one aspect, the regulation additionally prevents data transfer from the processing components 1003 and 1005 to an external destination if such data to be transferred from the processing components 1003 and 1005 constitutes protected data (e.g., protected data may include or may be too similar to input data that is transferred to the processing components 1003 and 1005 to be employed for conformity evaluation or data analytics respectively).

In one aspect, the processing components 1003, 1005 and the data-storage components CS 1002 are further configured to transfer data related to inputs for regulations stored on the distributed-ledger system CD 1004 before transferring data to other system 1001 components and/or external entities.

In one aspect, the data-storage components CS 1002 and the processing components 1003, 1005 are configured to require a certain data input, i.e., an activation input, related to actions of regulations stored on the distributed-ledger components CD 1004 in order to initiate data transfer with other system 1001 components and/or system-external entities.

In one aspect, regulations other than the non-editable ones can be additionally stored on the distributed-ledger components CD 1004. Those can be subject to another combination of private/public implementation and different consensus algorithms Particularly, a configuration as private components with a synchronized update to stored regulations following consensus established via the algorithm allows for editable regulations and influence on changes of the regulations by certain nodes of the database system underlying the distributed-ledger components CD 1004 only.

In one preferred aspect, the interfaces comprised by the processing components 1003, 1005 are further configured to receive data-transfer requests from system 1001—external entities and to allow system-external data transfer only if the access requests are allowable by the regulations, e.g., data-exchange regulations, on the distributed-ledger components; i.e., if a regulation exists that conditional to the contents of the specific access requests triggers specific data-transfer allowance. This allows for establishing an increased safety of transferred data and contributes to the transparency and trackability of data flow. Additionally, dynamic control of the data transfers can be implemented via changing regulations to be stored on the distributed-ledger components. Storing allowable and non-allowable access requests can be employed for evaluation future requests and/or reduce redundancies based on historical access requests and their execution.

In one aspect according to the application, regulations of data exchange between components of the system 1001 are implemented as smart contracts, i.e., computer programs intended to automatically execute actions according to terms of a contract. Such an implementation enables the regulations on the distributed-ledger components CD 1004 to represent transaction protocols with conditional automatic execution. The implementation of regulations as smart contracts allows for incorporating further conditional actions peripherally related to the analysis of health information, such as consent management, local regulatory processes, distribution of analysis results and/or rights, etc. Particularly, actions, e.g., data transfers, related to aspects of health-information analysis, which can be comprised in classical legal contracts, can be implemented as smart contracts.

Processing components configured for performing specific data analytics on specific health information 1005 (CA) comprise respective interfaces for data exchange with the data-storage components CS 1002 and system-external entities. Particularly, the interfaces are configured for receiving, from the data-storage components CS 1002, specific health information and receiving, from the external entities, specific analytics data.

The processing components CA 1005 are further configured to feed the data received to comprised processor(s) for processing for performing the received specific data analytics on the received specific health information.

The results of the specific data analytics on specific health information are employed for triggering further actions from the system 1001 components. For this purpose, the comprised interfaces selectively transfer data associated to the data-analytics results to respective system components and/or external entities.

Performing a specific data-analytics process can be understood as the execution of data-analytics algorithms received by the processing components CA 1005. All instructions for performing the specific data-analytics process are comprised by the analytics data received and they may comprise models, parameters, equations, executable program code, program code to be compiled before execution, and others.

The processing components CA 1005 may be additionally configured to perform a transformation of the received data-analytics data and/or a usual compiling process; generally, all processes leading to the received data-analytics data to be executable by the processing components CA 1005 can be comprised by the processing performed.

In one aspect, the processing of the processing components CA 1005 comprises an adaption of the received data-analytics data for the processing system, i.e., processes to increase processing efficiency, e.g., by adaptation for parallel computing.

The specific health information received by the processing components CA 1005 comprises a subset of the health information stored on the data-storage components CS 1002. The received subset corresponds to health information, for which the respective data related to health information in combination with specific analytics data related to analysis requests have been evaluated to a certain result by the conformity evaluation performed by processing components CE 1003. Similarly, the received data-analytics data is according to the conformity evaluation performed by processing components CE 1003.

Results of the specific data analytics performed by processing components CA 1005 on specific health information are transferred according to data-transfer regulations of the system 1001.

In one aspect, the processing components CA 1005 are further configured to transfer analytics results to system-external targets if, and only if, prompted by execution prompts on the distributed-ledger components CD 1004 and/or additional system-external input prompts, i.e., prompts received from external entities.

In another aspect, the dependence of the step of transferring analytics results on execution prompts on the distributed-ledger components CD 1004 is optional. This allows for controlling data flows related to the components CA 1005 either exclusively via regulations on the components CD 1004 and/or in combination with system-external inputs. Access to analytics processes and/or results can therefore be prevented increasing the safety of the components CD 1004 and of the involved data.

The flexible nature of the regulations on components CD 1004 allows for an accordingly flexible management of data flows related to analytics results.

In one aspect, the completion of the data-analytics process performed by the processing components CA 1005 automatically triggers the deletion of all received specific health information and/or all received specific data-analytics data.

In a further aspect, the completion of the automatic deletion process adds additional data to the results of the specific data analytics performed.

In one aspect of the application, the system 1001 is further configured to add additional processing components via integration of system-external processing components into either processing components CE 1003 and/or processing components CA 1005. Particularly, this integration includes the integrated processing components to be configured as sealed processing components, i.e., restricting their data-transfer according to regulations on the distributed-ledger components CD 1004. This can be technically accomplished via respective non-editable and editable implementations of said regulations.

In one further aspect, the integration of system-external processing components is limited by one or more of time, interaction number, processed data amount, and/or disintegration trigger prompts.

A limitation by time on the integration can be implemented by triggering a clock start at the moment when external processing components are being integrated, and then triggering a disintegration process when a set amount of time has elapsed after the clock start.

A limitation by interaction number on the integration can be implemented by incrementing a counter for every data transfer from/to the integrated processing components, and then triggering a disintegration process once the counter exceeds a set threshold.

A limitation by processed data amount on the integration can be implemented by recording the amount of ingoing data that has been employed in processing for data analytics, and then triggering a disintegration process once the data amount/volume exceeds a set threshold.

Additionally or alternatively, the integration can be negated via reception of input commands triggering the disintegration, i.e., disintegration trigger prompts.

The limitation of the integration can be part of regulations on the distributed-ledger components CD 1004. Integration of additional processing is envisioned to meet the processing needs of future data-analytics methods. Limited integration allows for a flexible adaption of the system processing requirements to current analysis tasks to be performed.

Particular analysis requests can comprise the need for the analysis to be performed on particular additionally integrated processing components. According to the application, this could be implemented by integrating the required processing component temporally into the system to perform the analysis according to the particular request.

In one aspect, integrated processing components in conflict with the sealed feature according to regulations on components CD 1004, can be disintegrated via disintegration trigger prompts, making them no longer able to transfer data to/from the system 1001.

Figure 2:
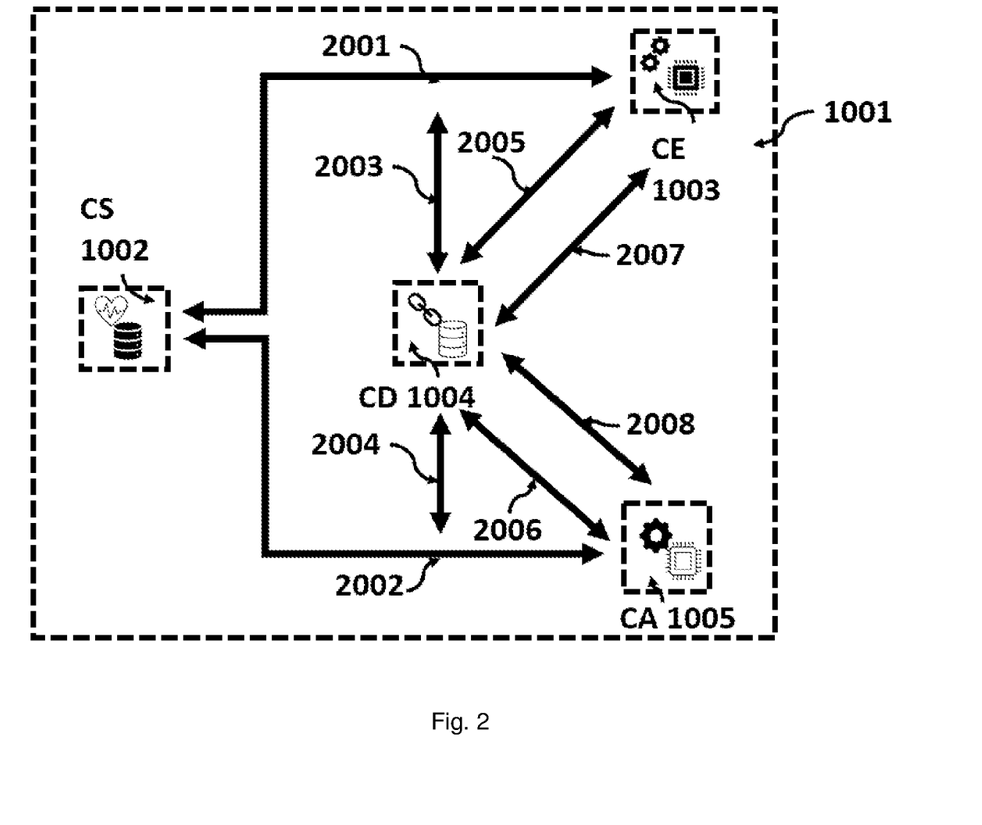
FIG. 2 is a block diagram depicting interactions between components of a system according to an embodiment of the present application.

FIG. 2 provides a schematic depicting interactions between the components of the system according to the present application.

System 1001 comprises data-storage components CS 1002, processing components CE and CA 1003, 1005 and distributed-ledger components CD 1004, which are configured for, generally, bi-directional data-transfers 2001, 2002, 2003, 2004, 2004, 2005, 2006, 2007, 2008.

Data transfer 2001 comprises the transfer of data related to health information, stored on components CS 1002, to processing components CE 1003, and the transfer of data-transfer triggers between components CS 1002 and components CE 1003. Data transfer 2001 can be dependent on data transfers 2003 from/to components CD 1004, which can be implemented as data transfer between components CD 1004 and either components CS 1002, components CE 1003; e.g., as part of transfer 2005; or a combination of both.

Data transfer 2003 may comprise data-transfer requests, access-request logs, execution prompts, other log data, ratings/evaluations, user feedback regarding data attributes, recommendations, and others. Particularly, data transfer 2003 allows the control of the system 1001 data flow via regulations stored on component CD 1004, according to the application.

According to the application, a transfer of data related to health information comprised in transfer 2001 from components CS 1002 to components CE 1003 can therefore be initiated by components CS 1002, initiated by components CE 1003, initiated by components CD 1004, or a combination thereof. The data transfer 2001 can therefore require additional input by the involved components 1002, 1003, 1004 and/or system-external components before execution.

Data transfer 2002 comprises the transfer of specific health information, stored on components CS 1002, to processing components CA 1005, and the transfer of data-transfer triggers between components CS 1002 and components CA 1005.

Data-transfer 2002 can be dependent on data transfers 2004 from/to components CD 1004, which can be implemented as data transfer between components CD 1004 and either components CS 1002, components CA 1005; e.g., as part of transfer 2006; or a combination of both. Data transfer 2004 may comprise data-transfer requests, access-request logs, execution prompts, other log data, ratings/evaluations, user feedback regarding data attributes, recommendations, and others.

Particularly, data transfer 2004 allows the control of the system's 1001 data flow via regulations stored on component CD 1004, according to the application. A transfer of specific health information comprised in transfer 2002 from components CS 1002 to components CA 1005 according to the application can therefore be initiated by components CS 1002, initiated by components CA 1005, initiated by components CD 1004, or a combination thereof. Data transfer 2002 can therefore require additional input by the involved components CS 1002, CD 1004, CA 1005, and/or system-external components before execution.

Data transfers 2005 and 2006 comprise the transfer of data between components CE 1003 and components CD 1004 and between components CA 1005 and components CD 1004, respectively, and comprise access requests, execution prompts, input prompts, according to aspects of the application. Particularly, data-transfers 2003, 2005 to control data flow between components CS 1002 and components CE 1003, and between components CS 1002 and components CA 1005 can be comprised therein. A combination of transfer 2005 and transfer 2006 can be implemented as an indirect data transfer between components CE 1003 and components CA 1005 via components CD 1004.

Data transfers 2007 and 2008 comprise separate transfers implementing the sealed feature of the processing components CE 1003 and CA 1005, respectively. Therefore, for each data transfer to be initiated from the sealed processing components CE 1003, CA 1005, data-transfer request is transferred to components CD 1004.

According to the application, the requested data transfer is prevented, i.e., no affirmative execution prompt is transferred from the components CD 1004 to respective processing components CE 1003, CA 1005, if a non-editable regulation on the components CD 1004 prevents the transfer based on the request and the regulation details.

According to the application, the regulation prevents sealed processing components CE 1003, CA 1005 from transmitting, to an external destination, certain protected data related to specific data analytics or to specific health information.

Additional data transfers not depicted in FIG. 2, particularly between system-external entities and the system 1001 components, can be implemented according to the data transfers described. Direct data-transfers between external entities and processing components CE 1003 and CA 1005 can be subject to system 1001—internal data-flow control via components CD 1004. For this data-transfers 2005 and 2006, respectively, can comprise data-transfer requests related to interfaces, e.g., to system-external entities, comprised by the respective processing components CE 1003 and CA 1005.

Integration of system-external processing components into the system 1001 as additional sealed processing components CE 1003 and CA 1005 can be implemented according to the procedure described for data transfers 2007, 2008. In one aspect of the application, the integration of system-external processing components is limited by one or more of time, interaction number, processed data amount, and/or disintegration trigger prompts. For this, additional data is comprised in corresponding data transfers.

Figure 3:
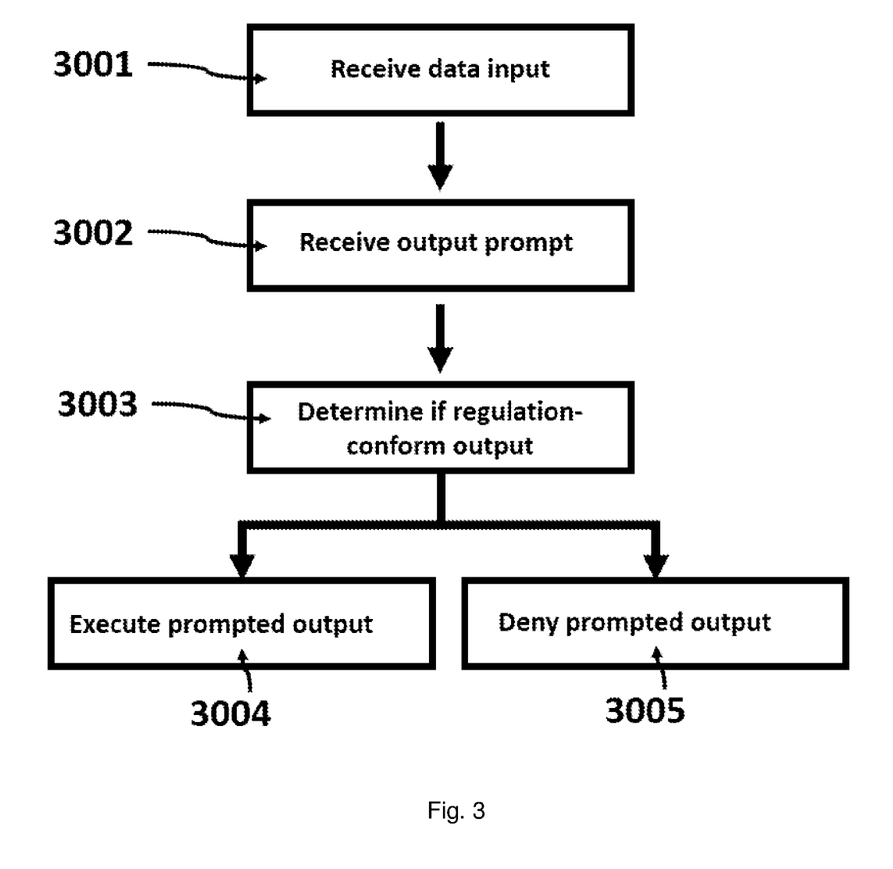
FIG. 3 is a flowchart depicting processes defining the sealed feature of processing components comprised by a system according to an embodiment of the present application.

FIG. 3 shows a flowchart depicting processes defining the sealed feature of processing components CE 1003 and CA 1005 comprised by the system 1001 according to the present application.

The sealed feature according to the application is implemented as a synergetic effect of the interactions between system components CE 1003 and CD 1004 and components CA 1005 and CD 1004. In one aspect, the sealed feature is implemented as comprised in the system 1001 data-flow control via the components CD 1004.

According to the application, the sealed feature is attributed to the processing components CE 1003 and CA 1005, whereby, once attributed, a non-editable regulation on the distributed-ledger components CD 1004 prevents the sealed processing components CE 1003 and CA 1005 from transmitting, to an external destination, certain protected data that are related to the specific data analytics or specific health information.

In one aspect, the processing components receive data 3001, e.g., data to be used for their respective processing, i.e., data required for a conformity evaluation or a specific data analysis. This data input is defined by the content, and it can comprise one or more subsets of health information stored on the components CS 1002, or data related to it, and/or it can comprise analytics data related to analysis requests or one or more subsets of specific data-analytics data. This data can optionally be stored. This data is fed into the processing performed by the respective processing components.

According to an embodiment, a processing output (e.g., a conformity evaluation result or a result of specific data analytics) is only transferred from the components if not prevented by a regulation on components CD 1004. In other words, a processing output is not immediately and unconditionally transferred from the processing components to an external destination; rather, the processing output may only be transferred to an external destination if permitted by a regulation on components CD 1004.

For this, an output prompt is generated by the processing components. The output prompt comprises one or more of a comparison, a result of a comparison, and/or score reflecting the similarity with respect to received data input 3001 and processing results. The output prompt is transmitted 3002 to the components CD 1004.

According to regulations stored on components CD 1004, the output prompt is determined 3003 to either be compliant to regulation or not.

Particularly, according to the application, the output prompt is determined to be not compliant to regulation if the processing output comprises or is too similar to specific data analytics or specific health information which is to be prevented from being transferred to an external destination. For example, output data which is partially or fully identical to protected input data would be prevented from being transferred to an external destination, but output hash data or output metadata is not considered as being similar and would not be prevented from being transferred to an external destination. Other output data may be evaluated according to a similarity evaluation, as discussed above, to determine a degree of similarity relative to the protected input data, and such output data may or may not be prevented from being transferred to an external destination based on whether such output data is determined to be above or below a threshold degree of similarity, respectively. The degree of similarity may be determined, for example, based on how much of the input data can be unambiguously and directly derived from the output, and respective output data may be determined as being too similar to input data in case that a certain threshold amount of the input can be unambiguously and directly derived from the output data.

In one aspect, the output is determined to be protected data that is related to specific data analytics or health information if the comparison, the result of a comparison, and/or the score reflecting the similarity, comprised by the output prompt, is determined to fulfill certain conditions, e.g., exceeding a threshold value. For instance, the comparison can be based on a deterministic finite-state automata (DFA), as often implemented for pattern matching or lexical analysis. Depending on the determined regulation-compliance, an execution prompt is generated and transferred by the components CD 1004 to the processing components CE 1003 and CA 1005. Receiving of this execution prompt either triggers the execution of the output 3004 of processing results or the output is denied 3005, i.e., not executed. In both cases, additional actions may be triggered, e.g., further processing, further data transfer, etc.

Figure 4:
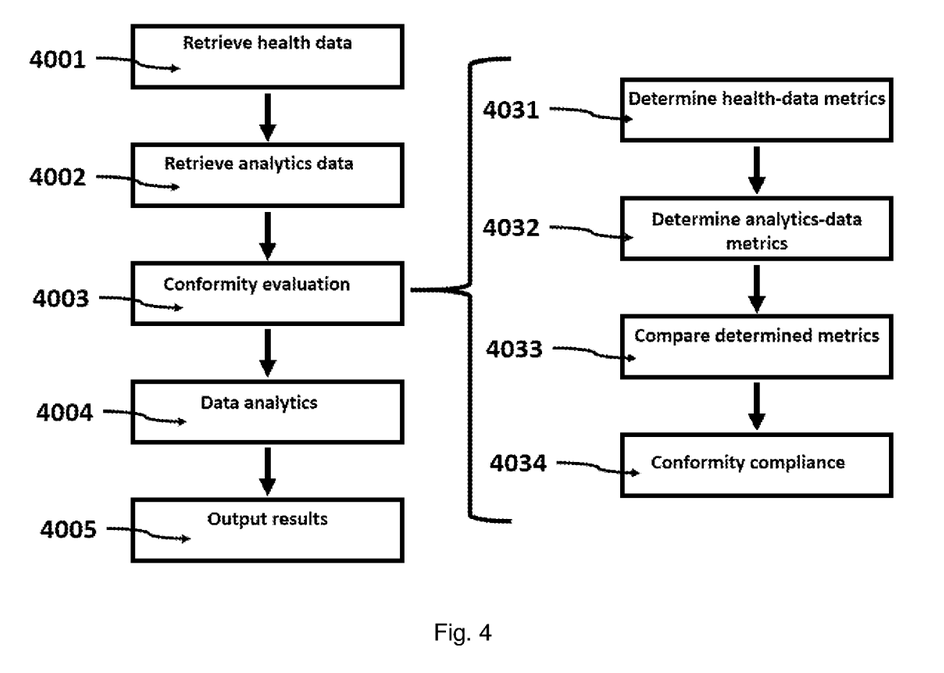
FIG. 4 is a flowchart depicting steps of a computer-implemented method according to an embodiment of the present application.

FIG. 4 provides a flowchart depicting the steps of the computer-implemented method according to the present application.

According to the application, a computer-implemented method is provided. Unless stated otherwise or excluded by logic, the process steps comprised by the method can be performed in an arbitrary order, time-delayed, and/or iteratively, as well as in partial combination.

The method comprises the step of retrieving data related to health information from a data storage 4001. When implemented by the system 1001 according to the application, the data storage can be comprised by the data-storage components CS 1002 and the data can be retrieved to the processing components CE 1003. The retrieval may comprise further processes and additional encryption/decryption, translation of the data, and processes aimed at increasing data-transfer efficiency.

The method further comprises, in no particular dependence on, and optionally parallel to, the retrieving 4001 of data related to health information, the step of retrieving of analytics data related to analysis requests 4002. When implemented by the system 1001 according to the application, the data can be retrieved to the processing components CE 1003.

The method further comprises, subsequential to the previous steps 4001 and 4002, the step of triggering the performing or performing of a conformity evaluation 4003 of data retrieved in step 4001 and data retrieved in step 4002. When implemented by the system 1001 according to the application, the triggered conformity evaluation can be performed by the processing components CE 1003.

The triggered conformity evaluation to be performed can comprise any algorithm that identifies certain subsets of two or more data sets, whereby the identified subsets fulfill a conformity condition. Particularly, data-matching methods, e.g., based on a DFA, can be comprised.

In one aspect, the performed conformity evaluation can be based on respective data metrics comprised in the retrieved health data and analytics data. For this, the conformity evaluation, to be performed in step 4003 of the method, comprises the step of determining health-data metrics 4031 after retrieving health data 4001 and determining analytics-data metrics 4032 after retrieving analytics data 4002.

The conformity evaluation further comprises the step of comparing metrics determined in previous steps 4032, 4033, and based on the comparison 4033 determine conformity compliance 4034.

In one aspect, determining conformity compliance 4034 comprises the results of metrics comparison 4033 with preset quantitative parameters, e.g., a conformity threshold. In one aspect, conformity compliance 4034 is determined for matching subsets of retrieved health data and retrieved analytics data, and results in identification of the respective data subsets, for which conformity compliance is determined.

The method further comprises, based on the performed conformity evaluation triggered or performed in step 4003, triggering 4004 the performing of data analytics according to a conformity-compliant subset of retrieved analytics data on a conformity-compliant subset of retrieved data related to health information.

When implemented by the system 1001 according to the application, the triggered data analytics can be performed by the processing components CA 1005. This step can comprise retrieving subsets of health data and analytics data according to the conformity evaluation.

When implemented by the system 1001, the data can be retrieved from components CS 1002 and system-external entities.

The triggered performing of data analytics comprises processing data-analytics algorithms according to the retrieved data-analytics data on the retrieved health information.

Various data-analytics algorithms and methods may be utilized, such as machine learning algorithms with models, whereby the retrieved analytics data define architecture, parameters, inputs and outputs of the algorithm and models. In one example, an artificial neural network is trained with the retrieved health information, whereby architecture (e.g., layers, nodes, inputs, outputs) and parameters (e.g., initial weights, biases) are defined by the data-analytics data.

The method further comprises the step of output or triggering the output 4005, i.e., transfer of respective data, of the data-analytics results triggered by the previous step 4004, whereby the step further comprises preventing the output if the results constitute protected data related to the data retrieved in steps 4001, 4002.

In one aspect of the application, the execution of the method steps is conditional with respect to respective regulations implemented as smart contracts on a distributed-ledger system. When implemented by the system 1001 according to the application, the regulations are performed via interactions with components CD 1004.

According to the application, the method steps are performed by a computer. For this, a computer program is provided. The computer program comprises instructions, which when executed by a computer, carry out the steps of the method.

Some concrete example applications enabled by various aspects of the application are presented in the following. No limitations on the scope of the application should be inferred therefrom, and the person skilled in the art will appreciate to arrive to a variety of additional embodiments without departing from the application.

In one example application, a health-data analytics entity requires specific health information for specific analytics to be performed. In parallel, a healthcare provider might aggregate a large quantity of health information derived from patients, therapies, prescribed drugs, etc. However, both parties are interested in keeping control of their respective health information or analytics data; particularly impacts on data security of patient-related data and non-controllable data proliferation inherent to classical data-exchange processes, e.g., copy from source to destination, are to be prevented.

Employing aspects of the application, the analytics entity can submit analysis requests to the system 1001 of the application. Such an analysis request may contain data related to a set of analytics to be performed and the requirements on health data for the analysis, as well as terms of financials, use rights, and analysis-results sharing. According to aspects of the application, such an analysis request can be employed to generate a regulation, e.g., a smart contract, on the distributed-ledger components CD 1004 of the system 1001, whereby the regulation contains conditions and actions based on the request.

Consequently, the generated regulation can be employed to prompt inputs of the data-storage components 1002 and/or system-external entities connected to the healthcare provider with health information. Conditional on an approval of the healthcare provider, e.g., via data transfer to the system components CD 1004 confirming the conditions of the regulation, the regulation may be executed. This results in the triggering of data-processing components CE 1003 to pull data related to health information from data-storage components CS 1002 and/or system-external entities connected to the healthcare provider and to pull data related to analytics requests from the system-external entities connected to the data-analytics entity.

The data pulled by data-processing components CE 1003 do not comprise analytics or health data to be prevented from being shared. Any output from the data-processing components CE 1003 to an external destination is prevented; thus, addressing mentioned problems inherent to data sharing and data-safety requirements of medical data.

In a further process enabled by the application, the pulled data are used to identify subsets of provided data related to health information and respective subsets of provided data related to analytics data, for which the data they respectively represent can be matched to perform the requested specific analytics processes according to the regulation, in the frame of the performed conformity evaluation. Involved parties may be informed about the positive result of the evaluation, and optionally pending on their approval via data transfers to components CE 1003 and/or components CD 1004, the regulation on components CD 1004 is updated to include some results of the performed conformity evaluation.

In case all conditions of the regulation are met, the processing components CA 1005 are triggered to perform specific data analytics on specific health information according to the regulation including the results of the conformity evaluation. For this, specific health information and specific analytics data are pulled from the healthcare provider, e.g., via components CS 1002, and from the data-analytics entity, and the specific data analytics processes are performed by components CA 1005. Since processing components CA 1005 are implemented as sealed components, processing components CA 1005 is able to pull specific health information and/or specific analytics data, but transfer of such data (and/or processing results that contain such data or are too similar to such data) to an external destination may be prevented via regulations.

The results of the performed analysis may be put out and/or distributed to components of the system 1001 and/or external entities connected to the healthcare provider and the data-analytics entity. Particularly, controlled via the regulations on the components CD 1004, actions conditional to the performed analysis and/or conditional to extent of the analytics results, are triggered. This may include transfer of the results to the data-analytics provider, and triggers of system-external actions, such as financial transfers to the healthcare provider.

According to another embodiment of the application, the regulations on the system components CD 1004 allow for a time-delayed conditional matching of analytics requests to providable health information, allowing the regulations to be employed to facilitate a marketplace representing offer and demand of health information and their analytics.

In another embodiment enabled by the application, generating new regulations on the system components CD 1004 as consequence to analytics requests includes prior comparison with existing regulations. In case a data-analytics entity requests a specific analysis to be performed, existing/historic regulations matching the newly generated can allow for omitting the conformity evaluation to be performed and, pending on approval of involved parties, the system can directly perform the analytics according to pre-stored regulations.

In another application enabled by the application, a data-analytics entity may require health information to perform specific data analysis on their own processing components. Such a request can generate a respective regulation and, according to the application, trigger implementation of system-external processing components, i.e., the components associated with the data-analytics entity, as sealed processing components CA 1005 into the system for the limited purpose of performing specific data analytics only. After performing the specific analysis, the integrated processing components can be disintegrated.

According to embodiments of the application discussed above, it will be appreciated that certain protected health data and/or protected analytics data (and/or certain other protected data that is too similar to such health and/or analytics data) may be maintained and utilized in a protected manner, such that owners of the protected health data, as well as data analytics entities making analytics requests, may retain control over their respective protected health data and protected analytics data. Only data and/or processing results which are allowed to be output to an external destination, e.g., according to regulations implemented via distributed-ledger components (e.g., CD 1004), are output to respective external entities outside of a set of sealed components, and protected health data and/or protected analytics data are not otherwise transferred to an external destination according to the regulations. The regulations may be implemented, for example, via smart contracts.

It will be appreciated that the execution of the various machine-implemented processes and steps described herein may occur via the execution, by one or more respective processors, of processor-executable instructions stored on one or more tangible, non-transitory computer-readable mediums (such as random access memory (RAM), read-only memory (ROM), programmable read-only memory (PROM), and/or another electronic memory mechanism). Thus, for example, operations performed by various "components" as discussed herein may be carried out according to instructions stored on and/or applications installed on one or more respective computing devices.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for managing analysis of health information, the system comprising:
   one or more memories configured for storage and retrieval of health information, wherein the health information is owned by a first entity;
   one or more first processors configured for performing a conformity evaluation of data related to the health information and analytics data related to an analysis request, wherein the analysis request is from a second entity different from the first entity, wherein a result of the conformity evaluation indicates whether the health information stored in the one or more memories is suitable for the analysis request, and wherein the conformity evaluation is performed without exposing the health information to the second entity;
   a distributed-ledger database system comprising a plurality of nodes configured for regulation of data exchange; and
   one or more second processors configured for performing specific data analytics on specific health information based on the conformity evaluation indicating that the health information stored in the one or more memories is suitable for the analysis request, and wherein the specific data analytics are performed and an analysis result is provided to the second entity without exposing the health information to the second entity;
   wherein the distributed-ledger database system stores one or more non-editable regulations to define the one or more first processors and/or the one or more second processors as sealed processing components which are restricted from outputting protected health information and/or protected data analysis information to external entities.

2. The system according to claim 1, wherein the first entity is a healthcare provider and the second entity is an analytics entity; and
   wherein the system is further configured to output the analysis result of the specific data analytics to the analytics entity and trigger a financial transfer to the healthcare provider.

3. The system according to claim 1, further comprising: interfaces for system-external access;
   wherein access-request logs are transferred to the distributed-ledger database system.

4. The system according to claim 3, wherein the interfaces are further configured to only allow system-external access to the one or more first processors and the one or more second processors based on respective access requests being allowable by data-exchange regulations on the distributed-ledger database system.

5. The system according to claim 1, wherein the distributed-ledger database system comprises interfaces to system-external components.

6. The system according to claim 5, wherein the regulation of data exchange is implemented via smart contracts which are automatically executed in response to input from the system-external components via the interfaces.

7. The system according to claim 1, wherein the regulation of data exchange is implemented via smart contracts which are automatically executed in response to input from one or more of: the one or more memories, the one or more first processors, the one or more second processors, or the distributed-ledger database system.

8. The system according to claim 1, wherein the data related to health information comprise additional metrics for one or more of a health-information type, a data quality, or a data quantity.

9. The system according to claim 1, wherein the analytics data related to the analysis request comprise additional metrics for one or more of a health-information type, a data quality, or a data quantity.

10. The system according to claim 1, wherein the one or more first processors are further configured to generate execution prompts and transfer the execution prompts to the distributed-ledger database system.

11. The system according to claim 10, wherein the one or more second processors are further configured to transfer analytics results to system-external targets based on being prompted by execution prompts on the distributed-ledger database system and/or additional system-external input prompts.

12. The system according to claim 1, wherein the system is further configured to integrate additional system-external processing components as sealed processing components.

13. The system according to claim 12, wherein the integration of the additional system-external processing components is limited by time, interaction number, processed data amount, and/or disintegration trigger prompts.

14. A method for managing analysis of health information, comprising
retrieving, by one or more first processors, data related to health information from a data storage, wherein the health information is owned by a first entity;
retrieving, by the one or more first processors, analytics data related to an analysis request, wherein the analysis request is from a second entity different from the first entity;
performing, by the one or more first processors, a conformity evaluation of the retrieved data related to the health information and the retrieved analytics data related to the analysis request, wherein a result of the conformity evaluation indicates whether the health information is suitable for the analysis request, and wherein the conformity evaluation is performed without exposing the health information to the second entity;
performing, by one or more second processors, specific data analytics on specific health information based on the conformity evaluation indicating that the health information is suitable for the analysis request, wherein the specific data analytics are performed without exposing the health information to the second entity; and
outputting an analysis result of the performed specific data analytics;
wherein the one or more first processors and/or the one or more second processors are subject to non-editable regulations stored on a distributed-ledger database system, wherein the non-editable regulations define the one or more first processors and/or the one or more second processors as sealed processing components which are restricted from outputting protected health information and/or protected data analysis information to external entities.

15. The method according to claim 14, wherein the first entity is a healthcare provider and the second entity is an analytics entity; and
wherein the analysis result of the specific data analytics is output to the analytics entity and a financial transfer to the healthcare provider is triggered.

16. The method according to claim 14, wherein the distributed-ledger database system stores regulations implemented as smart contracts.

17. The method according to claim 16, wherein performing the conformity evaluation comprises:
determining first metrics for one or more of a health-information type, a data quality, or a data quantity for subsets of the retrieved data related to health information;
determining second metrics for one or more of a health-information type, a data quality, or a data quantity for subsets of the retrieved analytics data related to the analysis request;
comparing the first and second metrics; and
based on the comparison and a threshold value, establishing conformity-compliance between subsets of the retrieved data related to health information and subsets of the retrieved analytics data related to the analysis request.

18. One or more non-transitory computer-readable mediums having processor-executable instructions stored thereon for managing analysis of health information, wherein the processor-executable instructions comprising
retrieving, by one or more first processors, data related to health information from a data storage, wherein the health information is owned by a first entity;
retrieving, by the one or more first processors, analytics data related to an analysis request, wherein the analysis request is from a second entity different from the first entity;
performing, by the one or more first processors, a conformity evaluation of the retrieved data related to the health information and the retrieved analytics data related to the analysis request, wherein a result of the conformity evaluation indicates whether the health information is suitable for the analysis request, and wherein the conformity evaluation is performed without exposing the health information to the second entity;
performing, by one or more second processors, specific data analytics on specific health information based on the conformity evaluation indicating that the health information is suitable for the analysis request, wherein the specific data analytics are performed without exposing the health information to the second entity; and
outputting an analysis result of the performed specific data analytics;
wherein the one or more first processors and/or the one or more second processors are subject to non-editable regulations stored on a distributed-ledger database system, wherein the non-editable regulations define the one or more first processors and/or the one or more second processors as sealed processing components which are restricted from outputting protected health information and/or protected data analysis information to external entities.

19. The one or more non-transitory computer-readable mediums according to claim 18, wherein the first entity is a healthcare provider and the second entity is an analytics entity; and
wherein the analysis result of the specific data analytics is output to the analytics entity and a financial transfer to the healthcare provider is triggered.

20. The one or more non-transitory computer-readable mediums according to claim 18, wherein the distributed-ledger database system stores regulations implemented as smart contracts.

* * * * *